United States Patent

Piazza et al.

Patent Number: 5,094,608
Date of Patent: Mar. 10, 1992

[54] ROTATIONAL MOLD APPARATUS

[75] Inventors: Charles L. Piazza, Somersworth; Edward E. Therrien, Newington, both of N.H.

[73] Assignee: Davidson Textron Inc., Dover, N.H.

[21] Appl. No.: 774,067

[22] Filed: Oct. 9, 1991

Related U.S. Application Data

[63] Continuation of Ser. No. 462,046, Jan. 8, 1990, abandoned.

[51] Int. Cl.⁵ .................. B29C 41/04; B29C 41/42
[52] U.S. Cl. .................... 425/434; 249/170; 264/311; 425/435; 425/442
[58] Field of Search ............... 264/310, 311; 425/429, 425/435, 434, 4.1, 817 R, 442, 453, 454, 425; 249/170, 171, 172

[56] References Cited

U.S. PATENT DOCUMENTS

| | | | |
|---|---|---|---|
| 2,301,125 | 11/1942 | Kramp et al. | 425/812 |
| 3,408,695 | 11/1968 | Scott | 249/170 |
| 3,561,060 | 2/1971 | Stephens | 425/435 |
| 3,602,949 | 9/1971 | Kaut | 249/170 |
| 4,008,990 | 2/1977 | Hiemer et al. | 425/454 |
| 4,043,729 | 8/1977 | Paracehi | 425/453 |
| 4,094,624 | 6/1978 | Halm | 264/311 |
| 4,755,333 | 7/1988 | Gray | 264/302 |

FOREIGN PATENT DOCUMENTS 2092509  8/1982  United Kingdom .

Primary Examiner—Jay H. Woo
Assistant Examiner—K. P. Nguyen
Attorney, Agent, or Firm—Reising, Ethington, Barnard, Perry & Milton

[57] ABSTRACT

A shell mold support apparatus for rotationally casting thermoplastic polymer particles onto a heated casting surface to form a thin polymer shell conforming to the shape of a heated casting surface includes a base framework that supports a bottom shell mold; a cover carrier is supported on the base framework so as to either open or close a cover or top shell mold with respect to the bottom shell mold; and a hinged support couples the cover carrier to the base framework for movement against an opening stop.

1 Claim, 2 Drawing Sheets

ROTATIONAL MOLD APPARATUS

This is a continuation of application Ser. No. 462,046, filed on Jan. 8, 1990, now abandoned.

FIELD OF THE INVENTION

This invention relates to rotational mold apparatus and more particularly to rotational mold apparatus having a base frame connected to the spider of a rotational mold for supporting a bottom shell mold and either a cover or a top shell mold for rotation by the spider to distribute thermoplastic polymer particles.

BACKGROUND OF THE INVENTION

Various rotational mold apparatus have been suggested for distributing thermoplastic particles against a heated mold surface to form a thin shell article conforming to the shape of the casting surface. Examples of such apparatus are shown in U.S. Pat. Nos. 3,222,725, 4,167,382 and 4,767,299. While suitable for their intended purpose such prior art mold apparatus require full removal of covers or top shells.

Likewise, various prior art rotational mold apparatus have been proposed with a pivotal member which operates during a molding cycle. Such apparatus however does not include a support for a concave shell mold forming one part of a closed casting system for depositing thermoplastic particles onto a heated mold surface for forming a thin shell article with a shape conformed to that of the casting surface. Examples of such mold apparatus are set forth in U.S. Pat. Nos. 2,060,121 which discloses a centrifuge for extracting water from bricks; 2,230,778 which discloses a tile press and cutter with a hinged cover; 3,844,702 which discloses a centrifugal mold for forming dentures; 4,008,990 which discloses a mold apparatus with two mold halves for forming polyurethane foam products; 4,411,531 discloses an extruder having a pivotal member which is provided for ease of cleaning a ram section of the apparatus. The arrangements do not disclose or suggest a shell mold apparatus in which a bottom shell mold is carried on a spindle for rotation on a spider and wherein a moveable cover carrier is operated to position either a cover or a top concave heated shell mold part in a closed position on the bottom shell mold during rotational molding and in an opened position on the spindle during cleaning of the shell mold surfaces so as to reduce the mold cycle time.

SUMMARY OF THE INVENTION

This invention includes a frame or spindle for supporting a concave mold on a rotatable spider. The spindle includes an aft bracket with a raised distal end connected by a pivot pin to one end of a cover carrier or top mold carrier for moving the cover or top shell mold into open and closed positions with respect to the bottom shell mold without having to remove the cover or top shell mold from the rotating spider during the molding cycle.

An object of the present invention is to reduce the cycle time required to clean the facing surfaces of the mold components in a rotational mold apparatus after thermplastic material has been deposited, cured and removed from the mold components.

A further object of the present invention is to provide a rotational mold apparatus in which the mold can be opened and closed without removing either a cover or a top mold member from a support spindle for a bottom mold member.

A still further object is to provide a shell mold apparatus for rotational casting of thermoplastic polymer particles against the surfaces of heated shell mold parts including either a cover or a top shell mold for closing a bottom shell mold during rotation of the apparatus to form a thin polymer shell on the casting surfaces of the closed mold parts wherein a spindle or base frame supports a bottom shell mold to receiver a charge of thermoplastic polymer particles and for forming part of a rotationally cast article and wherein a carrier supports either a cover or a top shell mold in either a closed position with respect to the bottom shell mold or in an open position with respect thereto; and a hinged support causes the carrier to lift from the spindle to a raised open position to provide access to the interior of the bottom shell mold and to the surfaces of the cover or the top shell mold for cleaning between rotational molding cycles without removing the cover or the top shell mold from the spindle.

Yet another feature of the invention is to provide for such lift by providing a brace aft on the spindle and a pivot pin on the brace connected to the carrier for pivotally supporting the carrier on the brace for swinging motion toward and away from the spindle.

A still further feature of the invention is to provide a hinged spindle assembly wherein a limit stop holds the carrier in its raised open position.

BRIEF DESCRIPTION OF THE DRAWINGS

These and other objects, features and advantages of the present invention will become more apparent from the following written description when taken in conjunction with the drawings wherein.

DESCRIPTION OF A PREFERRED EMBODIMENT

Figure 1:
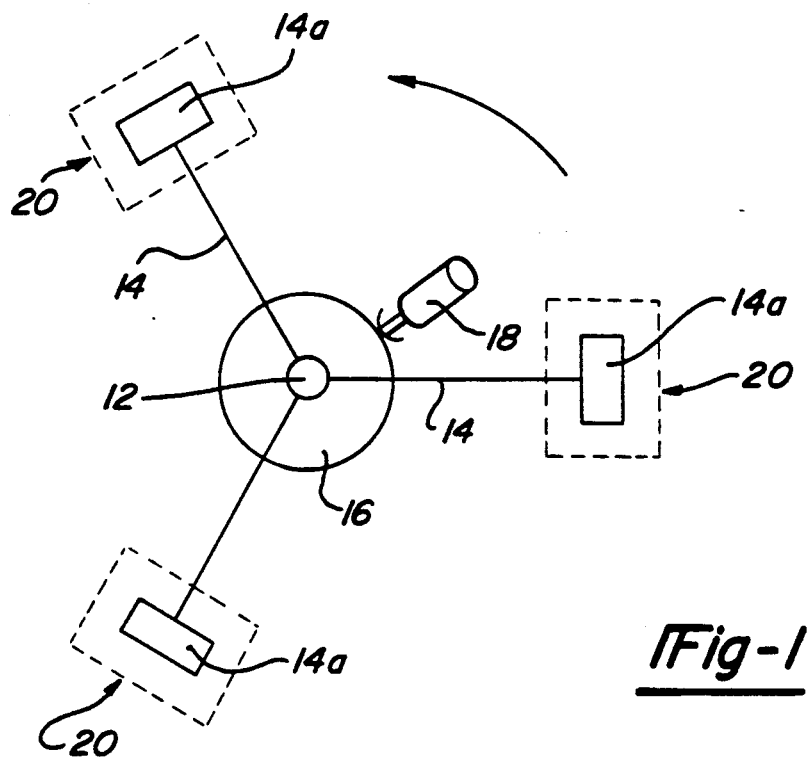
FIG. 1 is a schematic representation in plan view of a rotational molding apparatus including the hinged spindles of the present invention.
Figure 2:
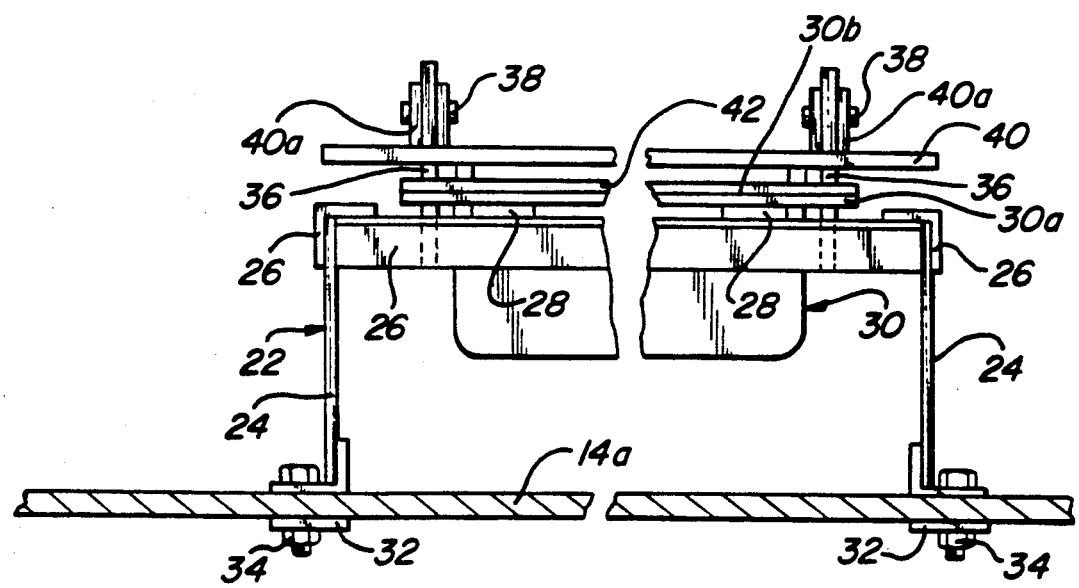
FIG. 2 is a front elevational view of the hinged spindle of the present invention.

Referring now to FIG. 1, a rotational molding apparatus 10 is shown. It includes a central drive 12 connected by spider arms 14 which extend radially thereof. The spider arms 14 rotate with the central drive 12. Additionally the spider and central drive 12 are supported on a platform 16 which is pivoted about a second axis perpendicular to the axis of rotation of the spider arms 14 by a second drive 18. As a consequence the ends 14a of the spider arms can move about two axes.

Each spider arm 14 carries a spindle assembly 20 constructed in accordance with the present invention to be easily cleaned and to be formed to support either two mold halves or a single concave mold half and a cover. While shown on a two axis drive, the spindle assembly is equally suitable for use on a one axis system in which only drive 14 is used.

More particularly, the spindle assembly 20 includes a frame 22 having four corner legs 24 joined by side frame members 26. The side frame members 26 support mold hanger plates 28. The hanger plates 28 support the neck 30a of a bottom shell mold 30. In the illustrated arrangement the frame legs 24 are connected to mounting plates 32 on the spider arms 14 by suitable fasteners 34, e.g., nuts and bolts.

The spindle assembly 20 further includes a bracket 36 located on the inboard or aft section of the spindle. The bracket 36 extends vertically of the neck 30a and has a distal end 36a with a bore 36b therethrough. The bore 36b receives a hinge pin 38 that connects to the aft end 40a of a downwardly inclined cover carrier or top shell mold carrier frame 40. The frame 40 has four sides which define an inner opening 40b that will accommodate an upper mold set if desired. The carrier frame 40 connects to a cover 42 which will seal an open upper end 30b of the concave shell mold 30 when the mold is closed during a rotational casting of the thermoplastic material. Such deposition phase includes deposition of a charge of suitable thermplastic casting material, e.g., polyvinyl chloride particles, polypropylene particles or polyetheylene particles against the heated surfaces 30c of the concave shell mold 30 by rotating the closed mold on the aforedescribed multiple axis support. The charge of material is thus evenly distributed across the casting surface 30c which is heated to fuse the particles to form a thin, solid shell article with a shape conforming to that of the casting surface 30c.

Figure 3:
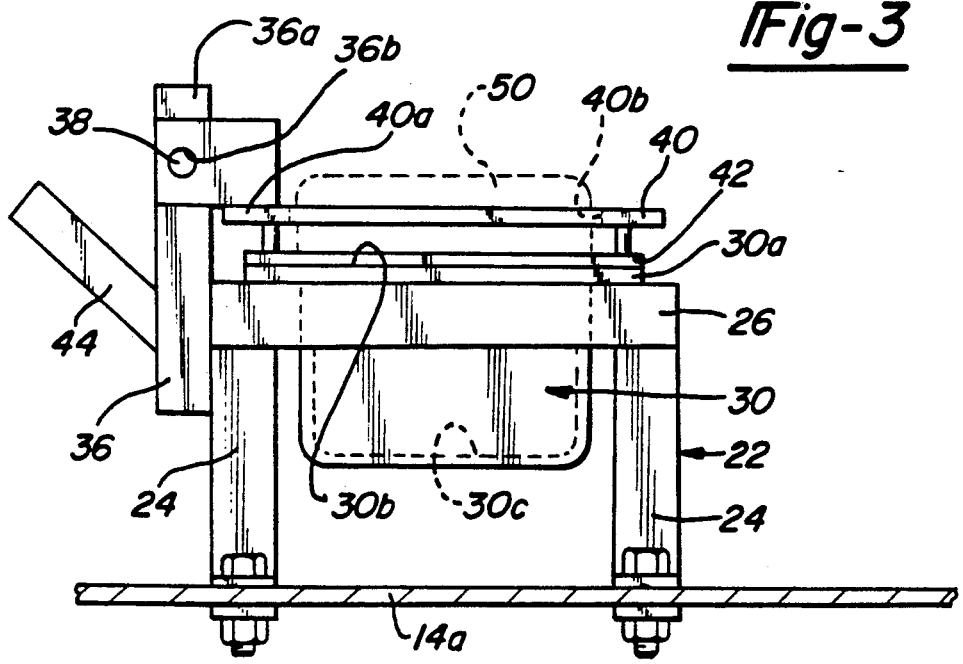
FIG. 3 is a side elevational view of the present invention in an open position for cleaning.
Figure 4:
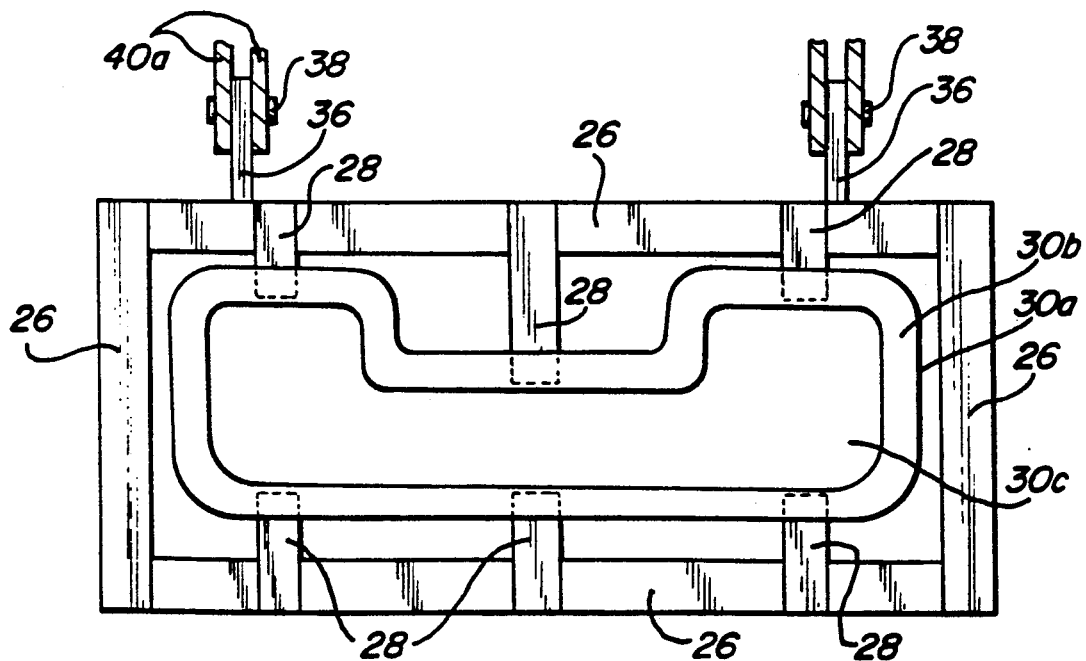
FIG. 4 is a top elevational view of the hinged spindle in FIG. 2 shown in an open position.

Following casting the hinged cover carrier 40 is lifted upwardly to pivot about the hinge pin as shown in FIG. 3 to provide access to remove the finished part from the concave shell mold 30. The raised position, shown in FIG. 3, also enables both the inside surface 42a of the cover and the casting surface 30c to be cleaned in preparation for a subsequent casting sequence.

The raised hinged cover carrier 40 is held in its raised position by a mechanical stop 44 which is located on the inboard or aft side of the spindle at an outward inclination with respect to the spindle.

The present invention provides a low cost spindle construction that will accommodate rest molds for casting thin shells for automotive trim products such as armrests, console shells and the like. The spindle construction can be adapted to other molds such as door panels, headrests and deeper draw armrests by increasing the height of the spindle frame.

The invention is also able to support a top set of concave molds 50 fit inside the carrier frame opening 40b as shown in dotted line in FIG. 3. The assembly enables a mold to be opened and cleaned with either a cover or concave upper mold part on the carrier without removing the cover or top set of molds from the spindles 20. Consequently, less cycle time is required to clean and seal the molds.

While the foregoing is a complete description of the preferred embodiment of the present invention, it should be understood that various changes and modifications may be made without departing from the spirit and broad scope of the present invention. The invention is limited only by the scope of the following claims.

What is claimed is:

1. In shell mold apparatus adapted to be mounted on the distal end of a spider arm extending from a central drive for rotational casting of thermoplastic polymer particles against the surfaces of heated mold parts during rotation of the apparatus to form a thin polymer shell on the casting surfaces of the heated mold parts the improvement comprising;

base support means having four corner legs with opposite ends thereon; means for fixedly securing each of said corner legs at one end thereof to the distal end of the spider arm; said base support means further including side frame members connecting said four corner legs at the opposite ends thereof;

hanger plates connected to said side frame members and extending inwardly thereof in substantially the plane containing the opposite ends of said four corner legs for supporting a first shell mold for receiving a charge of thermoplastic polymer particles;

a carrier frame having four sides defining an inner opening which opens above said carrier frame when the carrier frame is in a closed position to accommodate a second shell mold extending above said carrier frame for receiving a charge of thermoplastic polymer particles; said four sides further including means thereon for alternatively supporting a mold cover at a point below said four sides for sealing the first shell mold when the second shell mold is omitted and for alternatively supporting the second shell mold within the carrier frame to seal against the first shell mold when the mold cover is omitted; said carrier frame further including an end thereon adapted to be connected to a hinge pin;

two braces connected to one of said side frame members at space points thereon and extending above said one of said side frame members;

a hinge pin extending through each of said braces at a point above said side frame members and above said carrier frame when it is in its closed position; each of said hinge pins connected to said end of said carrier frame for mounting said carrier frame for pivotal movement with respect to said first shell mold to either lift a mold cover therefrom or to lift the second shell mold therefrom if the cover is omitted;

and an outwardly inclined member connected to said base support means for engaging said carrier frame to support said carrier frame in a raised position so as to provide access to said either said first shell mold or both said second shell molds following casting and curing of thermplastic polymer particles thereon.

* * * * *